(12) United States Patent
Ogasawara et al.

(10) Patent No.: US 7,613,525 B2
(45) Date of Patent: Nov. 3, 2009

(54) DISK DEVICE FOR SERIAL COMMUNICATION AND METHOD OF CONTROLLING THE SAME

(75) Inventors: Kenji Ogasawara, Kanagawa (JP); Hirofumi Saitoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 472 days.

(21) Appl. No.: 11/231,155

(22) Filed: Sep. 19, 2005

(65) Prior Publication Data

US 2006/0080483 A1 Apr. 13, 2006

(30) Foreign Application Priority Data

Sep. 30, 2004 (JP) ............................. 2004-287819

(51) Int. Cl.
*G11B 15/46* (2006.01)
*G11B 5/596* (2006.01)
*H02P 1/00* (2006.01)
*H02P 1/04* (2006.01)
*G05B 11/01* (2006.01)
*G05B 19/18* (2006.01)

(52) U.S. Cl. ........................... 700/1; 318/268; 318/255; 318/430; 318/560; 318/569; 360/73.03; 360/78.07

(58) Field of Classification Search ..................... 700/1; 318/255, 268, 430, 560, 569; 360/73.03, 360/48, 51, 69, 78.07

See application file for complete search history.

(56) References Cited

U.S. PATENT DOCUMENTS

| 5,034,837 | A  | * | 7/1991 | Schmitz ................... 360/256.2 |
| 6,198,590 | B1 | * | 3/2001 | Codilian et al. .......... 360/73.03 |
| 6,915,363 | B2 | * | 7/2005 | Wood et al. .................... 710/74 |
| 6,957,351 | B2 | * | 10/2005 | Emberty et al. ............. 713/300 |
| 2003/0115413 | A1 | * | 6/2003 | Wood et al. ................. 711/114 |

FOREIGN PATENT DOCUMENTS

| JP | 09102187 A | * | 4/1997 |
| JP | 2002-032952 A |  | 1/2002 |

\* cited by examiner

*Primary Examiner*—Ronald D Hartman, Jr.
(74) *Attorney, Agent, or Firm*—Townsend and Townsend and Crew LLP; Patrick Duncan

(57) ABSTRACT

Embodiments of the invention provide a disk device and a method of controlling the device which is capable of suppressing peak current, even for serial communication, that is required when initiating rotation of a spindle motor down to a level equivalent to that of parallel communication, without prolonging elapsed time before reaching the steady rotation speed. In one embodiment, an HDD includes a serial communication circuit which executes serial communication with a host, an SPM which rotates a disk, an HDC/MPU which controls the SPM and the serial communication circuit. The HDC/MPU, after shutting down the serial communication circuit once, starts up the serial communication circuit again when rotation speed of the SPM reached the specified standard value, and establishes serial communication with the host by means of the serial communication circuit.

15 Claims, 11 Drawing Sheets t1: POR release
t2: SATA circuit start-up
t3: SATA circuit suspension
t4: SPM initiation
t5: SATA circuit start-up
t6: Regular rotation speed t1: POR release
t2: SATA circuit start-up
t3: SATA circuit suspension
t4: SPM initiation t1: POR release
t2: SATA circuit start-up
t3: SATA circuit suspension
t4: SPM initiation
t5: SATA circuit start-up

DISK DEVICE FOR SERIAL COMMUNICATION AND METHOD OF CONTROLLING THE SAME

CROSS-REFERENCES TO RELATED APPLICATIONS

This application claims priority from Japanese Patent Application No. JP2004-287819, filed Sep. 30, 2004, the entire disclosure of which is incorporated herein by reference.

BACKGROUND OF THE INVENTION

The present invention relates to disk devices adapted to execute serial communication and a method of controlling the disk devices, and more specifically to a disk device which is suitable for a hard disk drive that is intended to reduce electric current required when initiating rotation of a spindle motor to rotate a disk, and a method of controlling the disk device.

Devices using various types of media such as optical disks and magnetic tapes are known as information recording and reproducing devices. Among them, hard disk drives (HDDs) have become popular as storage devices for computers to such an extent that they are one of the storage devices indispensable for today's computers. Further, not limited to computers, their application is widening more and more due to the superior characteristics with the advent of moving picture recording/reproducing devices, car navigation systems, removable memories for digital cameras and so on.

With disk devices represented by the HDDs, they are configured such that read/write operations of data are executed with a read/write head on a disk that is rotated at a high speed by a spindle motor. When a spindle motor drives a disk, the maximum driving current is applied to rotate the spindle motor during the start-up period. This produces problems in that power consumption during the start-up period is large and a noise level is high.

Taking the above into consideration, in patent document 1 (Japanese Patent Laid-open No. 2002-32952), for example, a start-up signal associated with the minimum level of the electric current required for starting up the spindle motor is applied to the driving unit of the spindle motor to increase the rotation speed of the spindle motor to the specified rotation speed. Then, when the specified rotation speed is reached, the signal is switched over to the one which keeps the rotation speed of the spindle motor lower than the specified start-up rotation speed, and thereafter, a feedback control is applied to the driving unit of the spindle motor to keep the rotation speed. With such an arrangement, start-up power consumption is reduced by starting up the spindle motor with the minimum required electric current, thus minimizing the starting power.

Meanwhile, as interfaces for transmitting data between superordinate equipment (hereinafter referred to as the "host") and an HDD, such protocols as the Small Computer System Interface (SCSI), AT Attachment (ATA) interface and so on are generally used. In particular, the ATA interfaces are used in many computers in terms of improved interface functions and economical cost, and are also used as interfaces to storage devices of other types including optical disk storage devices. Due to requirements for improved recording density and performance of recording media, requirements for data transmission rate of the ATA interfaces are increasingly becoming more severe. In this connection, an ATA interface (Serial ATA) using serial transmission is proposed as a replacement of a conventional transmission system using a parallel transmission technology.

Standards for the Serial ATA are being formulated by the "Serial ATA Working Group", and non-patent document 1 ("Serial ATA II: Extensions to Serial ATA 1.0 Specification" (Retrieved on Sep. 24, 2004), Internet <URL: http://www.serialata.org/collateral/index.shtml>) which was already released states the detailed specifications thereof.

BRIEF SUMMARY OF THE INVENTION

With the Serial ATA, electric power to execute serial communication is newly required in addition to power consumption needed for conventional parallel ATA. In particular, increment in power consumption that is additionally required for serial communication constitutes a problem during the starting stages of spindle motor such as turning on the power of the motor. FIG. 11 is a pattern diagram showing transition of consumption current of a Serial ATA HDD and a parallel ATA HDD after the respective two HDDs are started up. As shown in FIG. 11, for example, after canceling Power On Reset (POR), the driving current Imax1 to be applied to the spindle motor is required for the parallel ATA HDD to initiate rotation of the spindle motor. On the other hand, the Serial ATA HDD requires the consumption current $\Delta I$ that is necessary to execute serial communication in addition to the driving current Imax1. Therefore, the Serial ATA HDD needs the driving current Imax1 for the spindle system and the consumption current $\Delta I$ (=Imax2) for the serial communication. However, the system (host) prepared for the parallel ATA HDD is designed considering the peak current value Imax 1 which is available when initiating the parallel ATA HDD. Therefore, if the Serial ATA HDD is about to be introduced without modification to the system of the same design, the peak consumption current value during the starting stages of the spindle motor will exceed the design value of the system. This may cause problems such as an inoperative system.

Further, as stated in Patent Document 1, when the maximum driving current is not applied to the spindle motor, but the minimum-required electric current is applied for starting, it is possible to suppress the peak current during the starting period to a low level. However, in this case, there is a problem in that time until the steady rotation speed is reached, or more specifically, time required for starting becomes longer.

The present invention has been made to solve such problems, and a feature thereof is to provide a disk device and a method of controlling the device which, even for the serial communication, can suppress the peak current level required during the starting up stages of a spindle motor rotation to the level equivalent to that of the parallel communication without prolonging the elapsed time before the steady rotation speed is reached.

A disk device according to an aspect of the present invention includes a serial communication circuit which executes serial communication with an external device, a spindle motor which rotates a disk, and a controller which controls the spindle motor and the serial communication circuit, wherein the controller makes the serial communication circuit to initiate communication with the external device when the rotation speed of the spindle motor is a specified reference value or over.

In the present invention, since serial communication is executed by the serial communication circuit when the rotation speed of the spindle motor is the specified reference value or over, it is possible to save electric power to be consumed in circuits, etc. that are necessary for the serial communication during stages in which the rotation speed of the spindle motor is insufficient and thus requiring large driving current, and also to reduce electric current to be consumed during the stage to start spindle motor rotation.

In addition, the controller is capable of suspending at least part of the serial communication circuit until the rotation speed of the spindle motor reaches the specified standard value, and thus, by suspending part of the serial communication circuit, it is possible to further save power consumption.

Further, the controller is capable of starting up rotation of the spindle motor after suspending at least part of the serial communication circuit, and thus, by suspending part of the serial communication circuit before starting up rotation, it is possible to reduce power consumption in advance before starting up rotation.

Furthermore, when starting up the spindle motor, the controller is capable of starting up rotation of the spindle motor after suspending at least part of the serial communication circuit, if the serial communication circuit is already started up, and the controller is also capable of verifying whether or not the serial communication circuit is already started up. Thus, if the serial communication circuit is initiated, it is possible to reduce power consumption by suspending part of the serial communication circuit.

In addition, one or more suspended modes which suspends at least part of the serial communication circuit may be provided, and the controller may be enabled to set the serial communication circuit to any one of the one or more suspended modes before starting up rotation of the spindle motor so that a suspended mode can be selected as appropriate according to a need or a system requirement.

Further, the serial communication circuit includes a converter circuit which converts a serial signal received from the external device to a parallel signal and converts a signal to be transmitted to the external device to a serial signal. In addition, the controller is enabled to suspend the converter circuit during the time period from the point when the spindle motor rotation is started up to the point when the specified rotation speed is reached, and thus it is possible to reduce power consumption by suspending the converter circuit that is not necessary when no serial communication is executed.

Furthermore, there are provided an active mode which allows the serial communication circuit to communicate with the external device and a plurality of suspended modes which suspend at least part of the serial communication circuit. In addition, until the rotation speed of the spindle motor reaches the specified reference value, the controller is enabled to set the serial communication circuit to a suspended mode whose switching time to the active mode is 10 msec or below among the above-stated plurality of suspended modes.

In addition, the serial communication circuit may comply with the Serial ATA Standard, and, for example, the disk device may be a hard disk drive which complies with the Serial ATA Standard.

The disk device according to another aspect of the present invention is provided with a serial communication circuit which executes serial communication with an external device, a spindle motor which rotates a disk and a controller which controls the spindle motor and the serial communication circuit, wherein the controller makes the serial communication circuit to initiate communication with the external device when driving current to be applied to the spindle motor is equivalent to the specified reference value or below.

In the present invention, since serial communication is executed by the serial communication circuit when the driving current to be applied to the spindle motor is equivalent to the specified reference value or below, it is possible to save power to be consumed in circuits, etc. that are required for the serial communication when the driving current to be applied to the spindle motor is large.

A method of controlling a disk device according to another aspect of the present invention is a method of controlling a disk device which includes a serial communication circuit which executes serial communication with an external device and a spindle motor which rotates a disk, and more specifically, the method is to monitor rotation speed of the spindle motor and make the serial communication circuit to initiate serial communication with the external device when the rotation speed is equivalent to the specified reference value or over.

In the present invention, since the serial communication circuit is made to initiate serial communication when the rotation speed of a spindle motor is equivalent to the specified reference value or over, it is possible not to execute unnecessary serial communication during the starting up stage of the spindle motor, thus minimizing the required electric current.

Further, it is possible to suspend at least part of the serial communication circuit during a specified time period until the rotation speed reaches the specified reference value. In this case, the specified reference value may be set to a rotation speed at which the driving current to be applied to the spindle motor is equivalent to the specified value or below. In addition, the specified time period may be set to a time period that is required for the driving current to be applied to the spindle motor to decrease a current value required to initiate the serial communication circuit from the maximum value during the rotation startup stage.

Furthermore, the serial communication circuit which is automatically initiated after canceling the POR can be suspended, and then, after the POR is suspended, rotation of the spindle motor is started up. Thereafter, after the rotation speed of the spindle motor reached the specified reference value, the serial communication circuit can be initiated again, thus enabling such arrangement to be suitably used during the starting period of the spindle motor rotation after canceling the POR.

In this case, the following sequence may be adopted: (1) the controller is initialized after canceling the POR; (2) a memory test is executed; (3) the serial communication circuit which is automatically initiated after canceling the POR is suspended; (4) rotation of the spindle motor is started up; (5) the rotation speed of the spindle motor is monitored; and (6) after the rotation speed reached the specified standard value, the serial communication circuit is initiated.

According to the disk device and the method of controlling the device thereof of the present invention, it is possible, even with serial communication, to suppress the peak current to the level equivalent to that of parallel communication without reducing driving current to be applied to a spindle motor.

BRIEF DESCRIPTION OF THE DRAWINGS

FIGS. 6(a), 6(b) and 6(c) are each a diagram showing the amount of electric current that is consumed in an interface to be used for communication during the time period from the point immediately after the POR is cancelled until the point when the SPM reaches the steady rotation speed, wherein FIGS. 6(a), 6(b) and 6(c) show a Parallel ATA HDD (conventional art), an HDD which adopts a Serial ATA Staggered Spin-Up option (comparative example) and the amount of electric current of an HDD of the embodiment according to the present invention, respectively.

FIGS. 7(a) and 7(b) are each a diagram describing effects of the present invention, wherein FIG. 7(a) is a graph showing the relationship between time and electric current of the POR sequence according to the comparative example, and FIG. 7(b) is a graph chart showing the relationship between time and electric current of the POR sequence of the embodiment according to the present invention.

FIGS. 9(a) and 9(b) are each also a diagram describing the effects of the present invention, wherein FIG. 9(a) is a graph showing the relationship between time and electric current of the POR sequence according to the comparative example, and FIG. 9(b) is a graph showing the relationship between time and electric current of the POR sequence of the embodiment according to the present invention.

DETAILED DESCRIPTION OF THE INVENTION

Hereinafter, a specific embodiment to which the present invention is applied will be described in detail with reference to the accompanying drawings. The embodiment of the present invention relates to a serial communication HDD which can suppress consumption current required by the HDD during the starting up stage of a spindle motor almost to the equivalent level of a parallel communication HDD.

Figure 1:
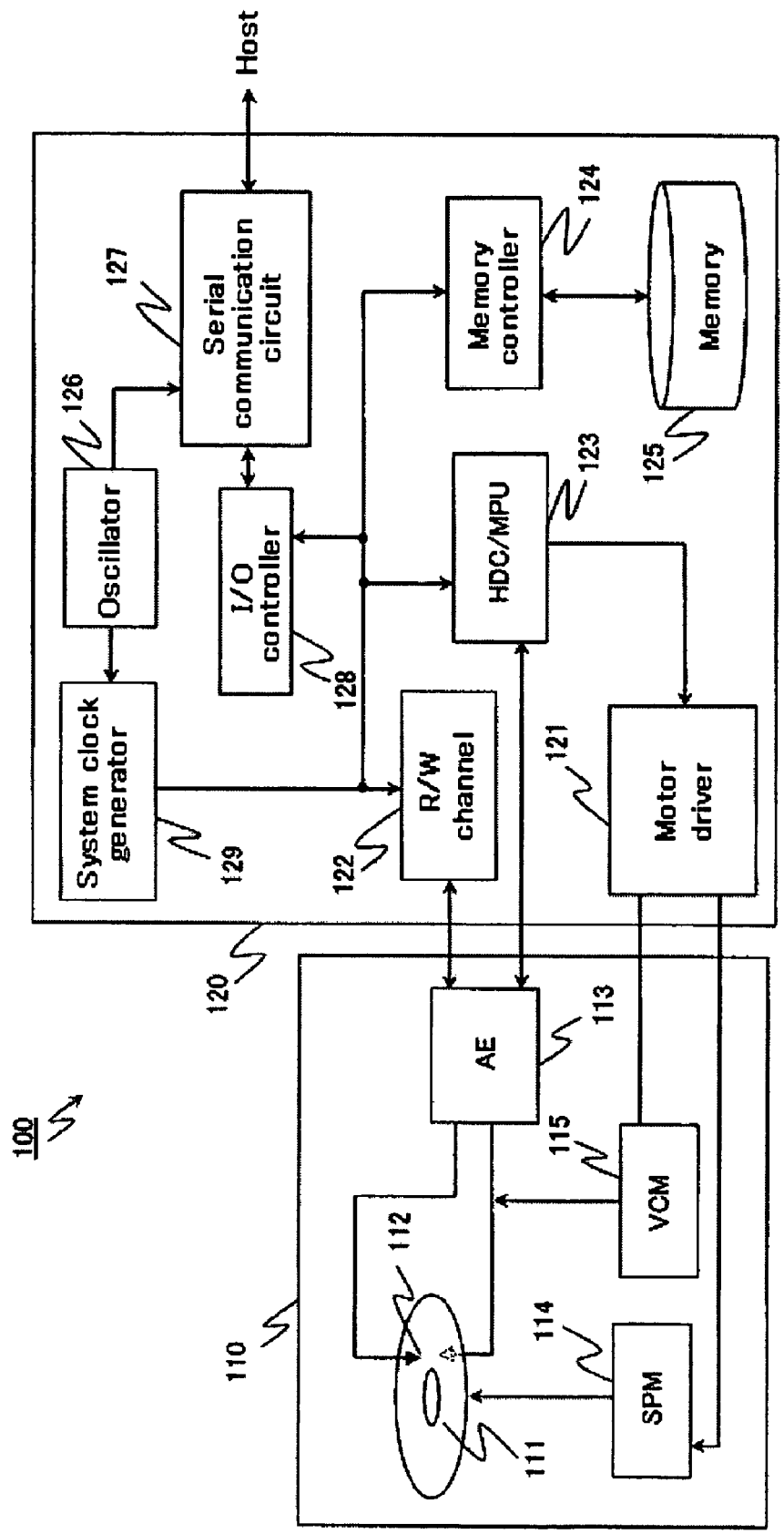
FIG. 1 is a diagram showing a schematic configuration of a hard disk drive (HDD) of an exemplary embodiment according to the present invention.

FIG. 1 is a diagram showing a schematic configuration of a hard disk drive (HDD) 100 of the embodiment. The HDD 100 includes, within a housing 110, a magnetic disk 111 which is an example of media, a head element 112 which is an example of heads, an arm electronic circuit (arm electronics: AE) 113, a spindle motor (SPM) 114, and a voice coil motor (VCM) 115. Also, the HDD 100 is provided with a circuit substrate 120 which is fixed on the outside surface of the housing 110. The circuit substrate 120 includes thereon a motor driver 121 which controls the SPM 114 and the VCM 115, a read/write (R/W) channel 122, a hard disk controller (HDC)/MPU integrated circuit (HDC/MPU) 123, a memory controller 124 and a memory 125 which consists of a RAM, etc.

Further, the circuit substrate 120 includes an oscillator 126, a system clock generator 129 which generates a system clock based on a signal of the oscillator 126, a serial communication circuit 127 which executes serial communication with a host, and an I/O controller 128.

Write data from an external host is received by the HDC/MPU 123 and is then written on the magnetic disk 111 by the head element 112 via the R/W channel 122 and the AE 113. Further, data stored on the magnetic disk 111 is read by the head element 112, and the data thus read is output by the HDC/MPU 123 to the external host via the AE 113 and the R/W channel 122.

The magnetic disk 111 is fixed on the rotation shaft of the SPM 114. The SPM 114 is driven by the motor driver 121 and rotates the magnetic disk 111 at a specified speed (steady rotation speed). The magnetic disk 111 is provided with respective recording surfaces to record data on both sides of the disk, and the head elements 112 which cope with the respective recording surfaces are provided. Each head element 112 is fixed on a slider (not shown in the figure). Further, the slider is fixed on a carriage (not shown in the figure) and the carriage is fixed on the VCM 115. The VCM 115 is pivoted to move the slider and the head element 112 with the aid of the carriage.

To enable reading/writing of data from/to the magnetic disk 111, the carriage moves the head element 112 over the data area on the surface of the rotating magnetic disk 111. As the carriage is pivoted, the head element 112 moves along in the radial direction on the surface of the magnetic disk 111, thereby enabling the head element 112 to access the desired area.

Typically, the head element 112 is integrally formed of a write head which converts electric signals to magnetic fields according to data to be stored on the magnetic disk 111 and a read head which converts magnetic fields from the magnetic disk 111 to electric signals. It should be noted that the at least one magnetic disk 111 suffices, and the recording surface can be formed on a single side or double sides of the magnetic disk 111.

The AE 113 selects one head element 112, out of a plurality of head elements 112, with which data accessing is executed, amplifies a read signal to be read back by the selected head element 112 at a constant gain (pre-amplifying), and sends the signal to the R/W channel 122. Further, the AE 113 delivers a write signal from the R/W channel 122 to the selected head element 112.

The R/W channel 122 executes a write process on the data transferred from the host. In the write process, the R/W channel 122 applies a code conversion to the write data supplied by the HDC/MPU 123, and further converts the code-modulated write data into a write signal (current) before supplying it to the AE 113. In addition, the R/W channel 122 executes a read process when supplying data to the host.

In the read process, the R/W channel 122 amplifies the read signal supplied by the AE 113 so that the signal amplitude can be constant, extracts data out of the read signal thus acquired, and executes a decoding process. The data to be read includes user data and servo data. The decode-processed read data is supplied to the HDC/MPU 123.

The HDC/MPU 123 is a circuit in which an MPU and an HDC are integrated into one chip. The MPU operates according to micro-codes loaded in the memory 125, and it executes control of the overall hard disk drive 100, including positioning control of the head element 112, interface control and defect control, as well as processes required for data processing. In particular, referring to the embodiment, the HDC/MPU 123 executes power saving of the serial communication circuit 127 to suppress the consumption current that is required during the rotation start-up stage of the SPM 114 to the level almost equivalent to that of the parallel communication HDD.

As the HDD 100 is being started up, data that is required for control and data processing, as well as micro-codes which operate on the MPU, are loaded to the memory 125 under control of the MPU from the magnetic disk 111 or a ROM (not shown in the figure) via the memory controller 124.

The serial communication circuit 127 converts a serial signal received from the host to a parallel signal, and converts a signal to be transmitted to the host to a serial signal from a parallel signal. The serial communication circuit 127 may be, for example, a circuit equipped with an interface capability (Host Interface Controller: HIC) which complies with the Serial ATA Standard. The serial communication circuit 127 establishes serial communication with the host and receives user data transmitted from the host, commands including a read command or a write command, etc. The serial communication circuit 127 converts such data thus received to a parallel signal, transfers user data to the R/W channel 122 via the I/O controller 128, and transfers such commands to the HDC/MPU 123. Further, the serial communication circuit 127 receives data that is read from the magnetic disk 111 and is acquired from the R/W channel 122 via the I/O controller 128, converts the data to a serial signal and transmits it to the host. Further, the HDC/MPU 123 executes a process for error correction (ECC) on user data that is acquired from the host or is read from the magnetic disk 111.

Data to be read by the R/W channel 122 includes servo data in addition to the user data. The HDC/MPU 123 uses the servo data to execute the positioning control of the head element 112. A control signal from the HDC/MPU 123 is output to the motor driver 121. The motor driver 121 supplies driving current to the VCM 115 according to the control signal. The HDC/MPU 123 uses the servo data to control read/write processes of data by using the servo data. Further, the motor driver 121 applies driving current to enable steady rotation of the SPM 114 according to the control signal from the HDC/MPU 123.

The HDD 100 configured as stated above is an HDD which executes serial communication with the host. In the description hereunder, the embodiment is described assuming that the HDD is an HDD which executes communication conforming to the Serial ATA Standard. However, even in case where the HDD does not conform to the Serial ATA Standard, if the HDD is capable of executing serial communication, it is possible likewise to reduce power consumption during the rotation startup stage of an SPM by setting part of the serial communication circuit which is not required during the rotation startup stage of the SPM to the power-saving mode.

The Serial ATA interface is configured with four layers: a physical layer, a link layer, a transport layer and an application layer. The physical layer has respective independent signal lines for transmission and reception, each of which executes differential transmission using a positive (+) signal and a negative (−) signal. Consequently, the layer has four signal lines in total. A connector (not shown in the figure) to be connected to the external host is provided with three grounding wires for shielding the layer in addition to the four signal lines.

The link layer executes sending and receiving of control characters called "Primitives" which are used to control sending and receiving of frames and communication. In addition, the link layer executes conversion of data to a data format suitable for transfer in the physical layer (to be transferred after converting 1-byte (8-bit) data to 10-bit data: 8b/10b encoding), scrambling of frame payloads, and generation/check of Cyclic Redundancy Check (CRC).

The transport layer handles structuring of frame payloads called Frame Information Structures (FIS's) and analysis of components in the FIS received. The FIS's include a Register FIS which transfers data on a register to a device from the host when issuing a command, and a Data FIS which is used when transferring data. The Serial ATA function exchanges data and commands with the host by using the FIS's.

Functions of the application layer include register setting which enables access from software, a DMA process, and interpretation and execution of a command. However, the specifications are not strictly defined in the Serial ATA Standard, and, in many cases, specifications are implementation-defined. For example, with the embodiment, the serial communication circuit 127 is set to the power-saving status by partially suspending part of the serial communication circuit 127. However, with the Serial ATA interface, as described later, two suspended modes are specified for the power-saving status according to the switching time (reset time) to the active mode under which serial communication with the host is executable.

With the Serial ATA HDD 100, when serial communication is established with an external host, the Serial ATA HDD exchanges data, command, etc. through the FIS, and it also exchanges primitives (Primitive Handshake) with the host to maintain the serial communication with the host. Consequently, the serial communication circuit 127 is always put in the active status to enable exchange of primitives with the host, even when user data, command, etc. are not exchanged for writing or reading to or from the host, thus consuming power.

Figure 2:
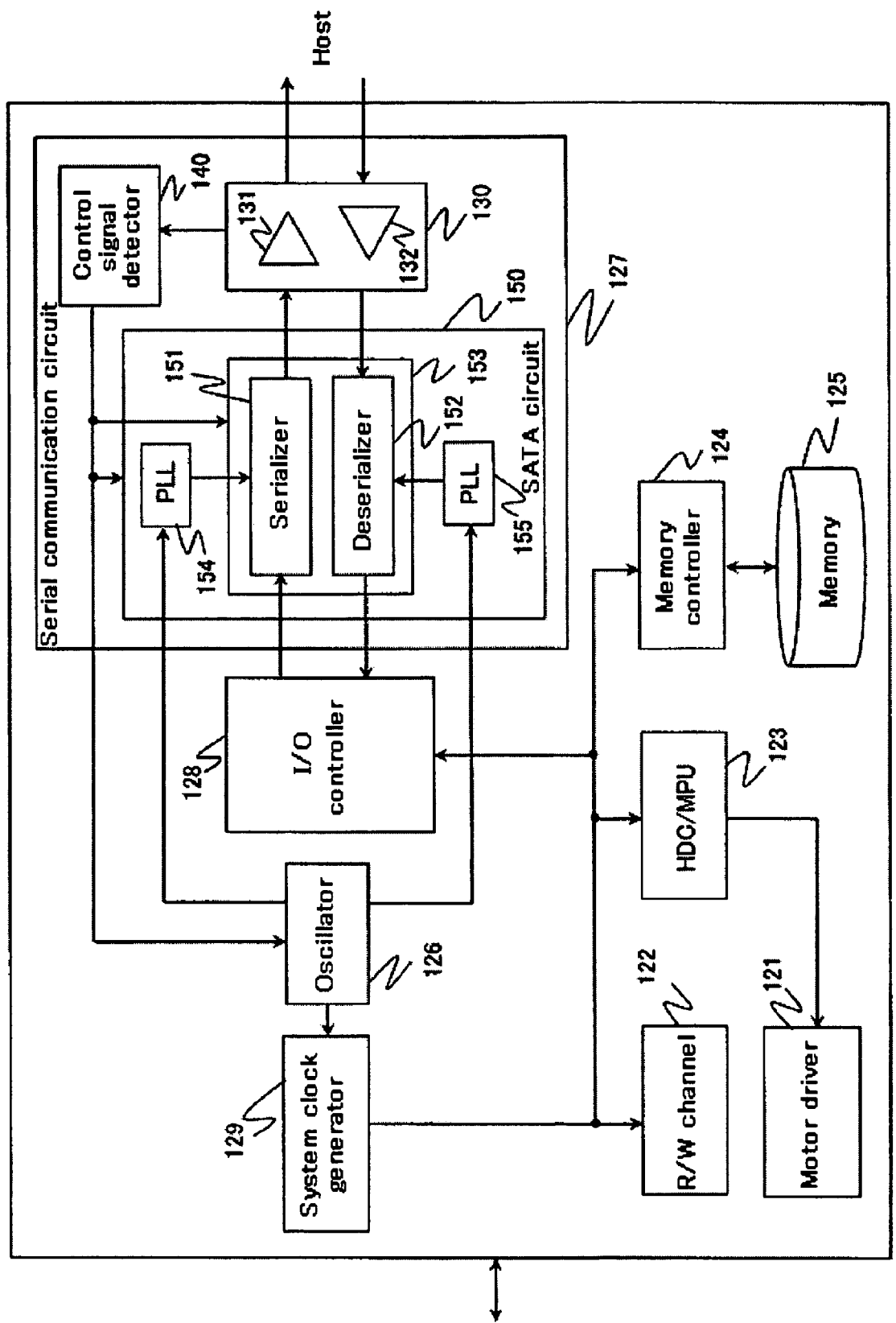
FIG. 2 is a block diagram for describing details of a serial communication circuit of an HDD of the embodiment according to the present invention.

FIG. 2 is a block diagram showing details of the circuit substrate 120 illustrated in FIG. 1. In FIG. 2, same reference numerals will be given to the same components as shown in FIG. 1, and detailed descriptions thereof will be omitted. As shown in FIG. 2, the serial communication circuit 127 includes an analog front end 130, a control signal detector 140 and a SATA circuit 150. The analog front end 130 has a transmitter 131 and a receiver 132. The SATA circuit 150 has a serializer/deserializer 153 and PLLs (phase-locked loops) 154, 155. The serializer/deserializer 153 has a serializer 151 and a deserializer 152. The serializer 151 converts commands, user data, etc. received from the I/O controller 128 to serial data and output the serial data to the transmitter 131. The deserializer 152 receives serial data from the host via the receiver 132 and converts the serial data to parallel data.

The I/O controller 128 supplies data to be transmitted to the host to the SATA circuit 150. The PLL 154 generates a clock signal for serial communication based on the signal from the oscillator 126 and supplies the signal to the serializer 151. The serializer 151 converts the received data to serial data which is synchronized with the clock signal generated by the PLL 154 and outputs the serial data to the host via the transmitter 131. Further, the data that is input via the receiver 132 is supplied to the SATA circuit 150. The PLL 155 generates a clock signal based on the signal from the oscillator 126. The deserializer 152 converts the received data to parallel data in synchronization with the clock signal and outputs the parallel data to the I/O controller 128.

Further, the HDD has several power saving modes, as described later, and has, for example, what is called a sleep mode, etc. as a power-saving mode, working over the entire HDD, which accompanies suspension of the system clock. In this case, the HDD executes a reset process from the power-saving mode accompanying suspension of the system clock, being triggered by a control signal, from the host, which is not based on a clock. The control signal detector 140 detects the control signal which is not based on a clock, initiates the oscillator 126 and starts generating a system clock. By using the above-described control signal, the HDD 110 is able to receive the control signal from the host, even if the system clock is suspended.

The serial communication circuit 127 which is configured as stated above executes sending and receiving of control characters called "primitives" as stated above to establish serial communication with the host, in addition to executing sending and receiving of commands, user data, etc. For this purpose, it is necessary that the serial communication circuit 127 should be put under the active status to maintain the serial communication with the host, and it is also necessary to supply power to the SATA circuit 150. Consequently, power to execute serial communication is additionally required, as compared to the conventional parallel ATA type.

Meanwhile, the HDD 100 initiates rotation of the SPM 114 after canceling (starting up) the POR (Power-on-Reset). At this time, the maximum driving current is applied to the SPM 114 to control the motor driver 121 so that the SPM 114 can immediately reach the steady rotation speed. When initiating rotation of the SPM 114, the HDD 100 requires the largest power consumption (hereinafter referred to as the "peak current"). Therefore, for a device like a laptop computer which has limited power to be supplied to the HDD 100, for example, the peak current required during the rotation startup stage of the SPM 114 is designed to be the supply limit. However, with the serial communication HDD 100, the peak current becomes larger than the peak current of the parallel communication HDD due to the above-described power which increases by executing the serial communication. Consequently, when an HDD which handles serial communication such as the Serial ATA is simply connected to a system that is designed assuming the peak current of conventional parallel communication HDD to be the supply limit, the power consumption to be supplied by the system will exceed the design value. This causes a possibility that the system or the HDD may not be operative.

Further, it could be conceivable to reduce the maximum current to be applied to the spindle motor. However, in this case, it will take longer time before the specified rotation speed is reached, or more specifically, the time before the HDD starts up will become longer. For example, the Serial ATA has various advantages such as that the transfer speed is 1.5 times or more that of the parallel ATA. However, when using an HDD conforming to the Serial ATA Standard, it is preferable in terms of overall system cost, etc., that the Serial ATA HDD can be connected without making any design changes on the host. More specifically, it is preferable that the HDD 100 can be operated with the peak current equivalent to that of a parallel ATA HDD, and also time required from starting up rotation of the spindle motor until the steady rotation speed is reached can be maintained at around the same level as that of the parallel ATA HDD.

Taking the above into consideration, the embodiment proposes a method of controlling a serial communication HDD. This method enables to suppress the peak current to be consumed by a device to substantially the same level as that of a conventional parallel communication HDD, while maintaining the driving current to be applied to the SPM substantially at the same level as that of a parallel communication HDD. The method of controlling the HDD according to the embodiment is particularly suitable to systems, etc. including the above-described laptop computer in which the maximum supply current is limited. Hereinafter, to make the present invention more understandable, a method of controlling a parallel ATA HDD will be taken as a conventional art and a method of controlling an HDD using the Staggered Spin Up option defined for regular Serial ATA HDD will be taken as a comparative example, and further a method of controlling an HDD according to the embodiment will be described along with such conventional art and comparative example.

Figure 3:
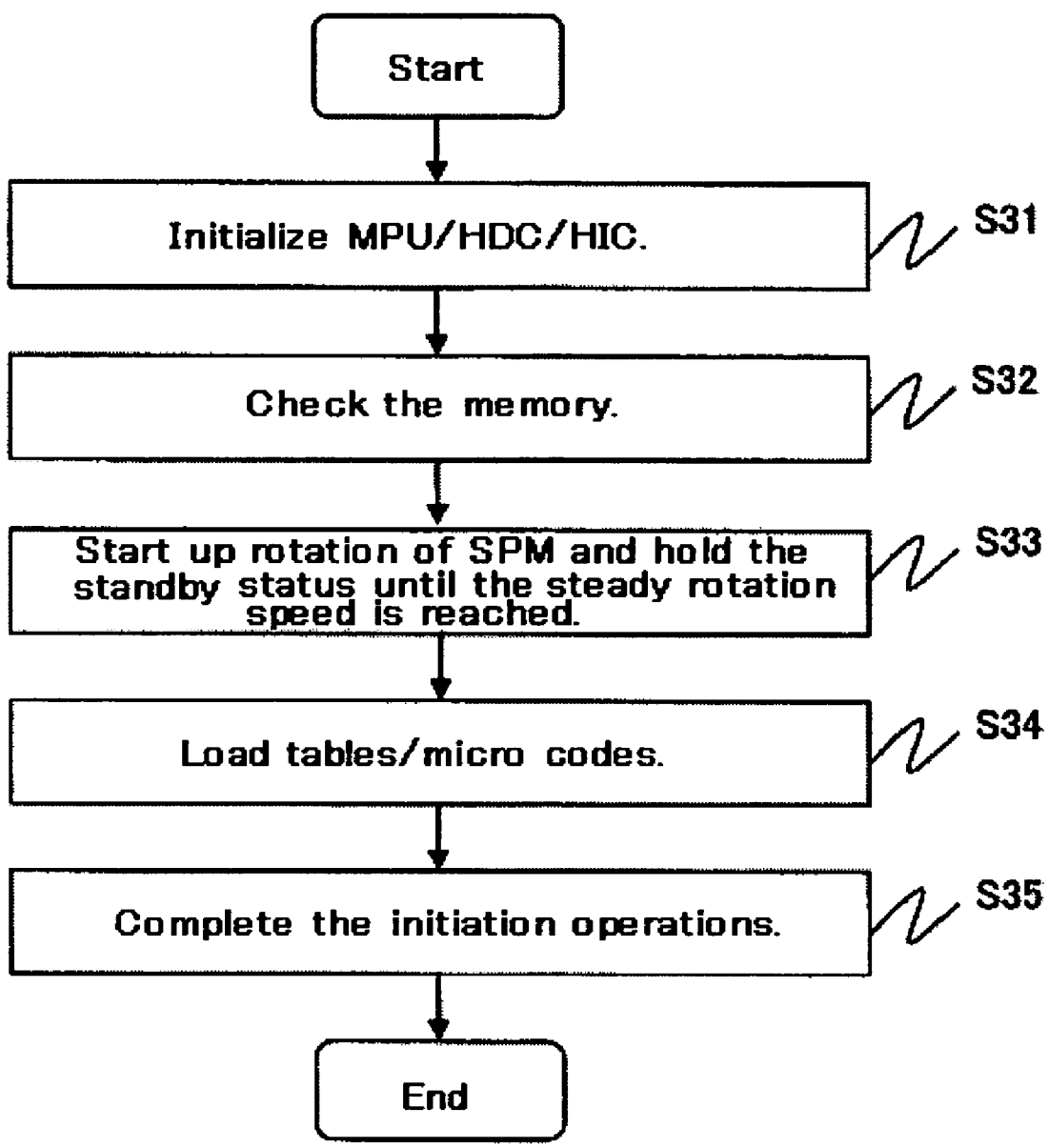
FIG. 3 is a diagram showing a POR sequence of a parallel ATA HDD.
Figure 4:
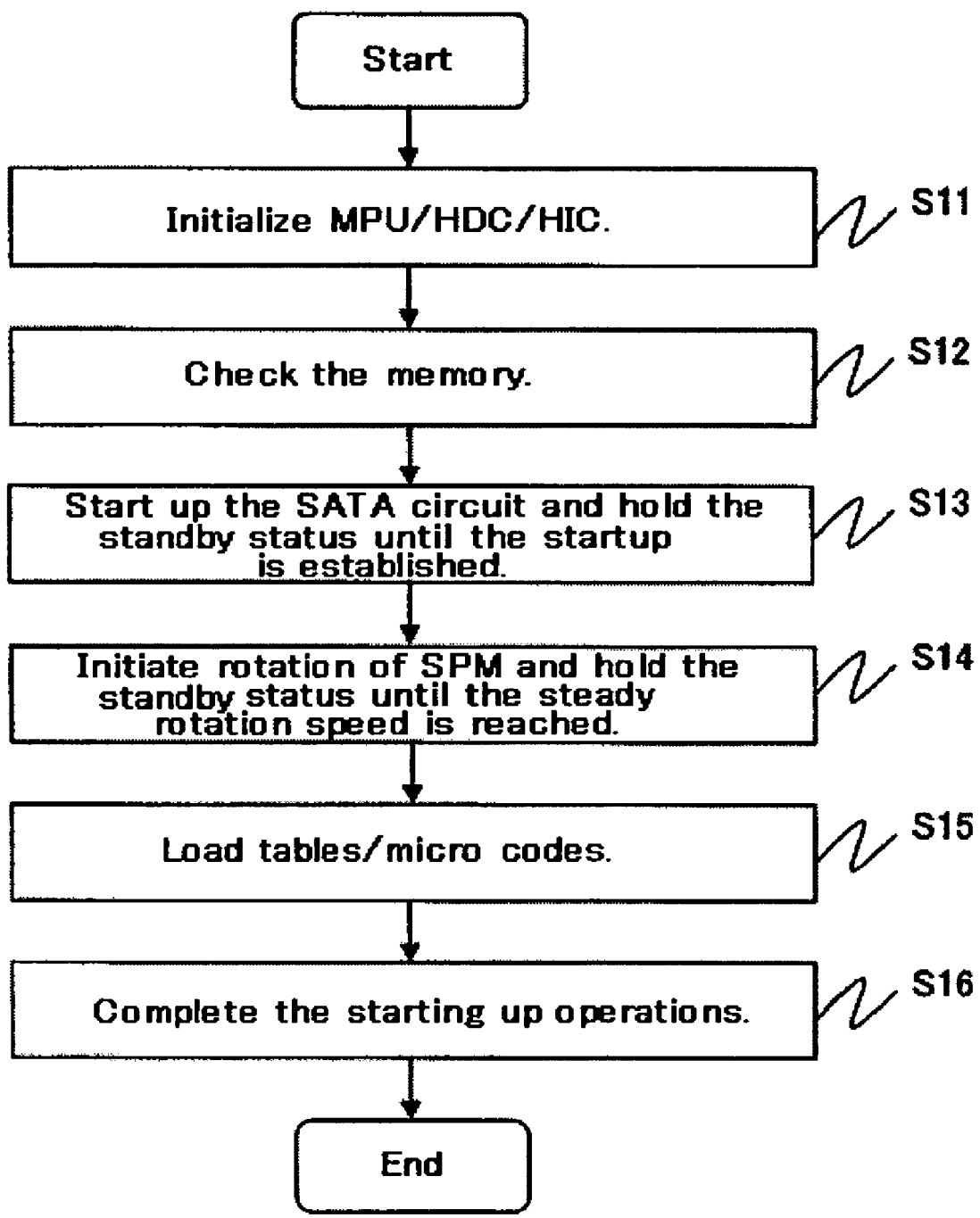
FIG. 4 is a diagram showing a POR sequence of the Serial ATA Staggered Spin-Up option.
Figure 5:
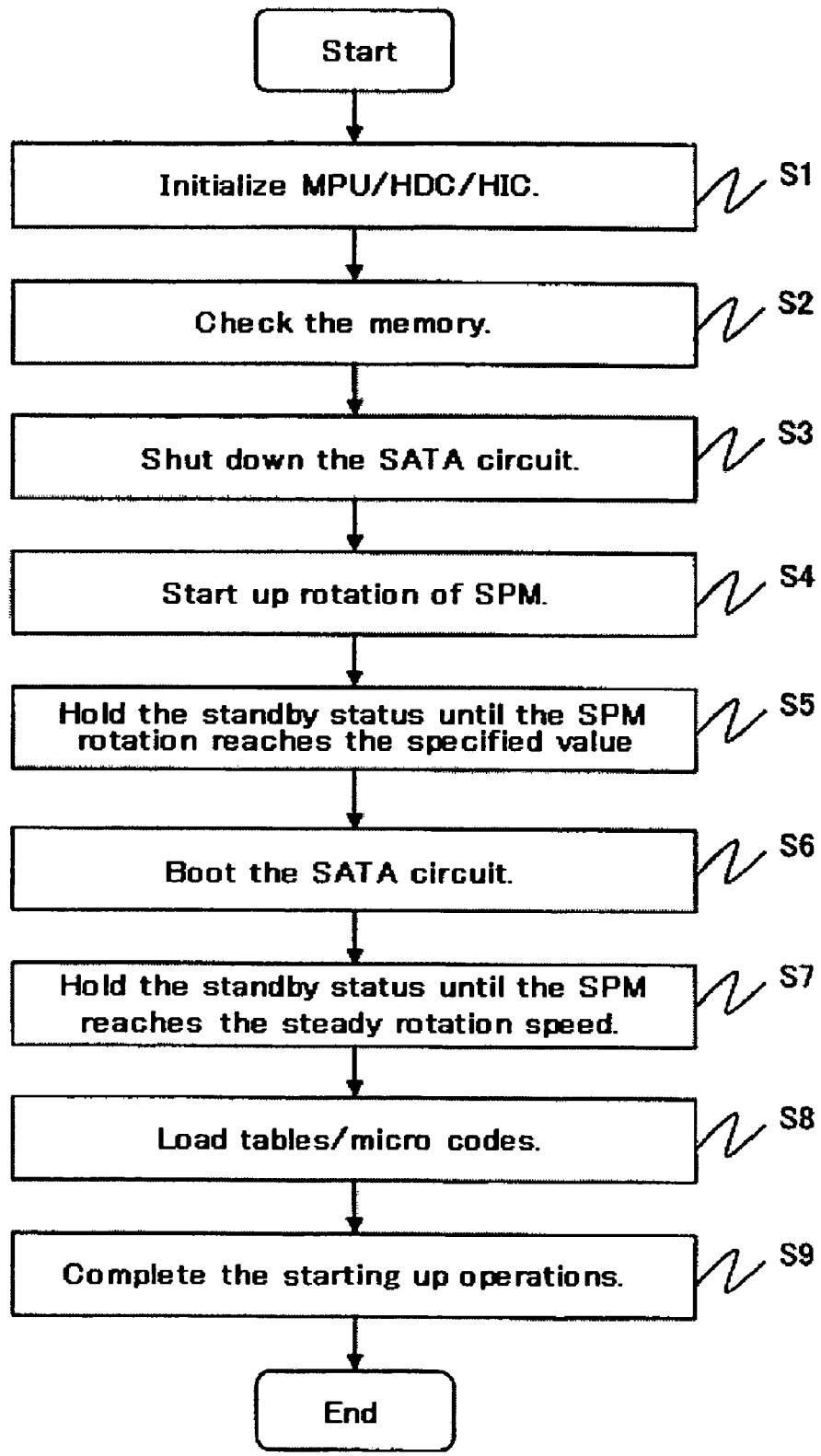
FIG. 5 is a diagram showing a POR sequence of an HDD of the embodiment according to the present invention.

With the embodiment, peak current will be reduced during the rotation startup stage of the SPM in which the power consumption required for the HDD 100 becomes largest by, for example, controlling every circuit after canceling the POR. Hereinafter, the circuit control process after canceling the POR is referred to as the POR sequence. FIGS. 3 to 5 are diagrams respectively showing the POR sequence of a parallel ATA HDD, an example of the POR sequence of a regular Serial ATA HDD (Staggered Spin Up option), and the POR sequence of an HDD according to the embodiment. It should be noted that, in the embodiment, a stage of turning on the power of the device will be described as an example of a rotation startup stage of the SPM. However, as described later, when the SPM stops rotating during a stage other than the rotation startup stage and the SPM will be restarted, the peak current can be suppressed to almost the same level as that of the parallel communication by restarting the SPM according to the similar sequence.

Figure 11:
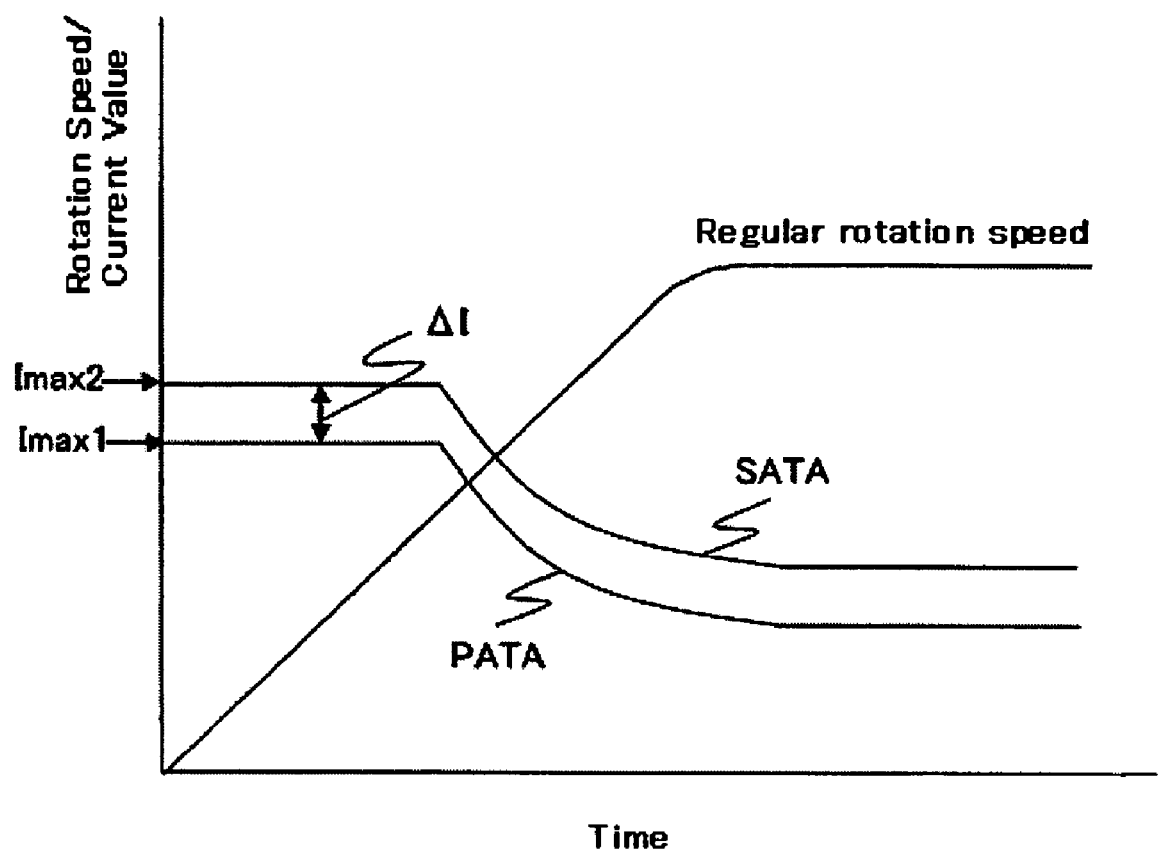
FIG. 11 is a pattern diagram showing transition of consumption current of a Serial ATA HDD and a parallel ATA HDD after the respective two HDDs are started up.

As shown in FIG. 3, with the POR sequence of a conventional parallel ATA HDD, HICs of an HDC/MPU, an I/O controller, etc. are initialized after canceling the POR (Step S31), and then a memory check is executed by the HDC/MPU 123 (Step S32). Thereafter, under the control of the HDC/MPU 123, driving current is applied to the SPM 114 by the motor driver 121 to start up rotation of the SPM 114. When rotation of the SPM 114 is started up, the HDC/MPU 123 monitors the rotation speeds and holds the standby status until the SPM 114 reaches the steady rotation speed (S33). During the rotation startup stage of the SPM 114, the maximum driving current Imax1 is applied, and, as shown in FIG. 11 described above, the current value required for driving the spindle motor gradually decreases as the rotation speed reaches the steady rotation speed. The current during the rotation startup stage will be the peak consumption current of the parallel ATA HDD. After the SPM 114 has reached the specified rotation number (rotation speed) showing the steady rotation, specified tables and micro codes are loaded on the memory 124 (S34), and a signal notifying that the startup operations (the POR sequence) has been completed is transmitted to the host (S35).

On the other hand, with a regular Serial ATA HDD, in addition to an HDC/MPU and an I/O controller, HICs of an SATA circuit, etc. which execute serial communication are initialized (Step S11). Memory checks of RAM/ROM, etc. are executed in the same way as the parallel ATA (Step S12). Thereafter, in a regular Serial ATA HDD, to establish serial communication with the host, the SATA circuit is automatically booted by the MPU (OOD SEQUENCE is initiated) and holds the standby status for a specified period of time until the link with the host is established (PHY_RDY) (Step S113). In this way, after the establishment of serial communication, the SPM is started up to rotate (Step S14). It should be noted that this is the POR sequence that is defined in the Staggered Spin-Up option of the Serial ATA Standard. In the option, when a plurality of Serial ATA HDDs are connected to a system (host), startup current of the entire system is reduced, first by establishing serial communication between the HDD and the system, and then controlling the system to stagger the rotation startup timing of independent Serial ATA HDD motors by means of the serial communication thus established. By dispersing rotation startup timings when connecting a plurality of HDDs to the host, it is possible to reduce the peak current.

More specifically, when a plurality of HDDs are connected to a host, it is possible to suppress the peak current required for the system down to a low level by staggering the rotation startup timing of a spindle motor of each HDD under the control of the host after establishing initiation of the SATA circuit. Then, the sequence holds the standby status until the SPMs of all HDDs reach the rotation speed that is equivalent to the steady rotation speed, and thereafter, upon loading tables and micro codes, the sequence transmits completion of the startup operation to the host (Steps S14 to S16).

Figure 6:
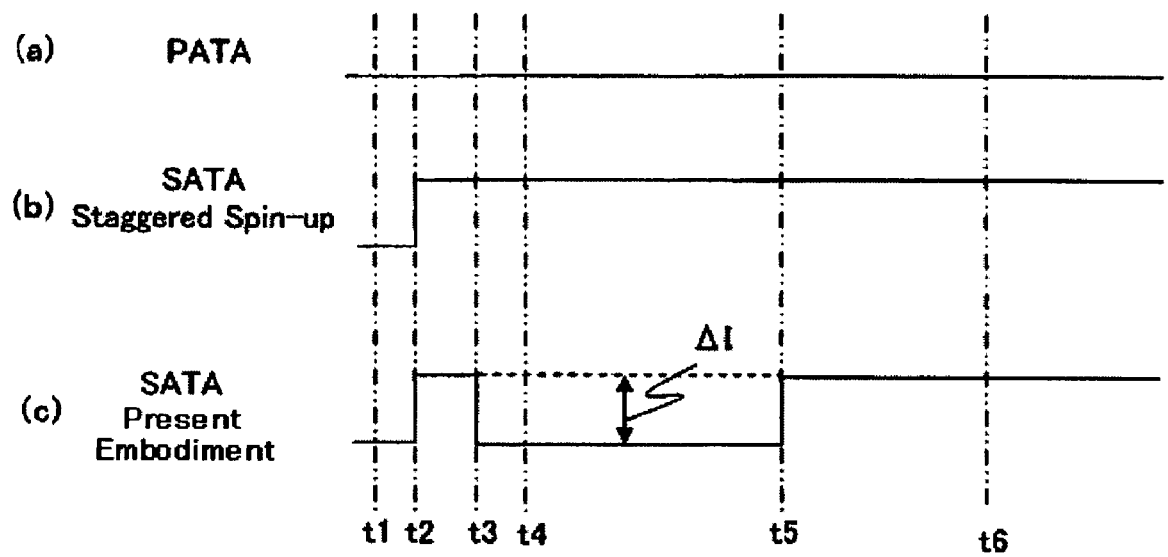

FIG. 6 is a pattern diagram showing the amount of electric current that is consumed in an interface to be used for communication during the time period from the point immediately after the POR is cancelled until the point when the SPM reaches the steady rotation speed. As illustrated in FIG. 6(a), with a parallel ATA HDD, no data exchange is executed with the host during the time period from the point immediately after the cancel of the POR, which is shown as a timing t1, until the point when the SPM reaches the steady rotation speed, and the electric current required for the interface is zero. On the other hand, with a regular Serial ATA HDD, serial communication is established with the host after canceling the POR; therefore, the specified amount of electric current ΔI is required at a timing shown as the timing t2 when the SATA circuit is booted. More specifically, as described above, with the Serial ATA HDD, the current ΔI which operates the SATA circuit 150 is always required. This is because sending and receiving of the above-described control characters called "primitives" are executed to establish serial communication with the host even when no receiving, etc. of user data to be written on a magnetic disk or specified commands to the HDD 100 is executed with the host. Consequently, the regular Serial ATA HDD requires the ΔI to execute serial communication in addition to the maximum current Imax1 which is required during the rotation startup stage of the SPM of the parallel ATA HDD, and thus the peak current will be: Imax1+ΔI=Imax2. More specifically, with the above-stated Staggered Spin-Up option, although it is possible to reduce consumption current that is required at a time when connecting a plurality of HDDs to a host, since the option is of serial communication, consumption current of at least Imax2 is required.

Whereas the regular Serial ATA HDD is characterized in the above, in the HDD according to the embodiment, it is intended to make the peak current Imax2 that is required during the rotation startup stage of the regular SPM of a Serial ATA to be the Imax1 which is almost equivalent to the peak current of a parallel ATA HDD. For this purpose, in the POR sequence after canceling the POR, rotation of the SPM 114 is started up in the following procedures.

As shown in FIG. 5, HICs such as the HDC/MPU 123, the I/O controller 128 and the SATA circuit 150 are first initialized, and then memory check of RAMs and ROMs are executed (Steps S1 and S2). Such processes are executed in the same way as those of the regular serial communication circuit shown in FIG. 4. With the Serial ATA HDD, in general as stated above, when the MPU is booted, circuits related to serial communication such as the SATA circuit 150 are activated for establishment of serial communication with the host. Here, with the embodiment, at least part of the serial communication circuit 127 is suspended. More specifically, the SATA circuit 150 is put in the suspended status, for example, by stopping supplying operation clocks to the SATA circuit 150 in the serial communication circuit 127 (Step S3).

With such arrangement, it is possible to eliminate ΔI which is required by the serial communication circuit 127 to execute serial communication, and thus the consumption current ΔI can be saved during the suspension period. More specifically, the ΔI which is required for the case where the Serial ATA is applied to the HDD can be eliminated during the period in which the SATA circuit 150 is suspended.

Thereafter, while holding the above-described status, rotation of the spindle motor is started up (Step S4), and the sequence is held in the standby status until the rotation speed of the SPM 114 reaches the specified standard value M1 (Step S5). Here, the term "until reaching the specified standard value M1" implies the rotation speed in which the electric current required for rotation of the SPM 114, that is, the driving current to be applied to the SPM 114 is less than the standard value. More specifically, it is preferable that the value should be the one at which the electric current equivalent to or exceeding the consumption current ΔI consumed by the SATA circuit 150 is decreased from the maximum driving current Imax. With the embodiment, since the SATA circuit 150 is not activated, the total consumption power of the SPM 114 and the SATA circuit 150 is almost equivalent to that of the parallel ATA HDD having no SATA circuit. However, when the SATA circuit is activated, the above-stated consumption current will increase by the consumption current ΔI of the SATA circuit 150. This is because, to reduce the consumption current to the level almost equivalent to the Imax1 of the parallel ATA HDD, it is necessary to boot the SATA circuit 150 at the timing when the driving current of the SPM 114 reduces by ΔI from the Imax1 or later. It should be noted that, with the embodiment, for example, the relationship between the rotation number of the SPM 114 and the electric current is measured in advance, and then judgment as to whether the electric current required for the spindle motor system has been less than the specified standard value or not shall be executed by observing the rotation number (rotation speed) with the MPU. However, for example, the current value required for the spindle motor system may be directly observed to judge as to whether or not the observed value is less than the above-stated standard value.

The HDC/MPU 123, upon recognizing that the rotation speed of the SPM 114 has reached the specified standard value M1, boots the SATA circuit 150 (Step S6). Booting of the SATA circuit 150 is executed in the same manner as Step S13 described above, and, upon booting the SATA circuit (initiating the OOB SEQUENCE), a link with the host is established (PHY_RDY). It should be noted that the establishment of the link (PHY_RDY) is only needed to sustain before completion of booting operations is notified to the host.

Thereafter, the sequence holds the standby status until the SPM 114 reaches a rotation speed M2 showing the steady rotation speed (Step S7), and then loads tables and micro codes (Step S8). With such arrangement, the fact that a series of startup operations are completed and status enabling receiving of user data, commands, etc. is established is transmitted to the host (Step S9).

In a series of the POR sequence, as shown in FIG. 6(c), even though the HDC/MPU 123 starts up after canceling the POR at the time point t1 and the SATA circuit 150 starts up at the time point t2, the SATA circuit 150 is switched to the suspended mode under the control of the HDC/MPU 123 before rotation of the SPM is started up (the time point shall be defined as the timing t3). At the timing t3 and thereafter, the electric current ΔI which is consumed by the SATA circuit 150 during the regular mode can be eliminated. Thereafter, rotation of the SPM 114 starts up at timing t4, and the consumption current ΔI of the SATA circuit 150 can be eliminated during the period from t4 to t5 in which the current value to be applied to rotate the SPM 114 is becoming less than the specified standard value. Therefore, even with the Serial ATA HDD, it is possible to keep the consumption current at the level that is almost equivalent to the peak current of the parallel ATA HDD. The SATA circuit 150 is started up at the timing t5 at which the current value to be applied to the SPM 114 becomes less than the specified standard value or thereafter. Here, with the embodiment, since the driving current to be applied to the SPM 114 is not designed to be decreased, it is possible to ensure that the time period (t4 to t6) during which the SPM 114 reaches the steady rotation speed can be kept almost equivalent to that of the parallel ATA. It should be noted that the timing t4 at which rotation of the SPM 114 starts up is only needed to be at a time point after the timing t3. In addition, for a case where the SATA circuit 150 is partially suspended, the electric current to be applied to the SPM 114 may be reduced so that the current can be the maximum applied current permitted for the system. Even in this case, however, it is possible to apply a larger current as compared with a case where the SATA circuit 150 is in regular operations.

Here, for the Serial ATA interface, two power-saving modes (suspended modes) called Partial and Slumber modes are specified for the serial communication circuit 127. The Partial mode is a suspended mode wherein the switching time to the regular mode (active mode) that enables serial communication with the host is about 10 μsec. or below and is sufficiently short for a regular command execution time, thus giving little influence on throughputs. On the other hand, the Slumber mode is a suspended mode having switching time to the active mode of about 10 msec. or below, and the slumber mode is enabled only if the HDC/MPU 123 or the host judges there is no influence on throughputs. Due to the restricted switching time, the Partial mode can be realized by stopping feeding power to only a part of the SATA circuit 150, for example. On the other hand, the Slumber mode can be set as a mode that enables to stop feeding power to the SATA circuit 150, thus practically eliminating the consumption power ΔI that is required for serial communication. When switching is made to the Partial mode or the Slumber mode, the HDC/MPU 123 switches the mode back to the active mode by supplying power as required to part or the entirety of the SATA circuit 150, if needed.

For example, with the embodiment, it is possible to realize the suspended mode of the SATA circuit, after completion of a memory check in Step S2, by allowing the MPU to switch the SATA circuit 150 to the Slumber mode according to the micro codes. It should be noted that the suspended mode is not limited to the Slumber mode, and the serial communication circuit 127 may switch the suspended mode, for example, to the Partial mode. Even with the Partial mode, the consumption current of the SATA circuit 150 can be reduced to some extent, and therefore, it may be arranged to switch the mode to the Partial mode according to conditions of the system, etc. to which the HDD 100 is connected. Alternatively, the Slumber mode or the Partial mode may be selected as appropriate.

Further, with the embodiment, it is described that, as part of the POR sequence, the serial communication circuit 127 is switched to a power-saving mode after the HDC/MPU 123 completes a memory check. However, the above-described switching to the Slumber mode or the Partial mode may be executed if the MPU is in the operable status, and the serial communication circuit 127 may be switched to a power-saving mode before executing the memory check.

The above is described as the POR sequence after canceling the POR. However, similar effects can be obtained with the similar sequence even for other cases where rotation of an SPM is started up. For example, an HDD is provided with a power-saving mode, working for the entire HDD, which is similarly provided in a parallel ATA, etc. in addition to the power-saving mode for the serial communication circuit 127. These power-saving modes are called, for example, standby mode, sleep mode, etc., and a plurality of power-saving modes are prepared according to switching times to a regular mode (active mode) in which the entire device becomes active. For example, the standby mode is configured such that the oscillator 126 and the system clock generator 129 are put in the operating status, and the motor driver 121, the R/W channel 123, the HDC/MPU 123 and the memory controller 124 are put in the suspended status. In this case, since the oscillator 126 and the system clock generator 129 are operating, a clock is generated, the I/O controller 128 and the serial communication circuit 127 are in the operating status, thus ensuring a status that enables serial communication with the host. In this case, the active mode can be reset according to a request from the host.

Further, in the sleep mode, the oscillator 126 and the system clock generator 129 are also suspended. In this case, all circuits except the analog front end 130 and the control signal detector 140 shown in FIG. 2 are suspended. If the oscillator 126 and the system clock generator 129 are also in the suspended status, it is possible to reset the HDD to the regular active mode by using the Software Reset or the Hardware Reset (e.g., COMWAKE and COMRESET provided to serial ATA). It should be noted that, since the Hardware Rest totally initializes controllers such as the HDC/MPU of an HDD, a reset process using the Software Rest initiated by the host is required. In the Serial ATA interface, since the Software Reset is associated with transmission of FIS's, the oscillator 126 and the system clock generator 129 are activated by the COMWAKE to enable transmission of FIS's, the Software Reset is received from the host, and a reset process is executed by using micro codes.

The present invention can be applied similarly even for a case where the rotation of SPM 114 is started up from the suspended status under such power-saving modes including the standby mode and the sleep mode. More specifically, when, upon receiving a reset request from the host, the HDD 100 is resetting the active mode from the power-saving mode, the HDD 100 first judges whether or not the serial communication circuit 127 is executing serial communication. For example, if the standby mode is established, since the serial communication circuit 127 is consuming the consumption current ΔI to maintain serial communication with the host, the serial communication circuit 127 is set to the suspended mode before starting up rotation of the SPM 114. Then, rotation of the SPM 114 is started up, the standby status is held until the rotation speed thereof reaches the specified standard value, the serial communication circuit 127 is switched to the active mode, and finally, the SPM 114 is rotated at the steady rotation speed.

Further, under the sleep mode in which the oscillator 126 and the system clock generator 129 are in the suspended status, the SATA circuit 150 is also in the suspended status, and serial communication is suspended. Consequently, the consumption power ΔI is not consumed in the serial communication circuit 127. However, the serial communication circuit 127 may be set to establish the serial communication. In this case, when the oscillator 126, the system clock generator 129 and the HDC/MPU 123 are reset according to the reset request from the host, the serial communication circuit 127 is suspended before rotation of the SPM 114 is started up as is the case described above. Furthermore, the serial communication circuit 127 may be also suspended after the POR is cancelled, or under a power-saving mode, and the serial communication circuit 127 may not start up or may not be automatically switched to the active mode upon receiving the reset request from the host. More specifically, the serial communication circuit 127 may start up or may be switched to the active mode only through the control by the MPU. In this case, the serial communication circuit 127 can be started up or is switched to the active mode at a time point when the rotation speed reaches or exceeds the specified standard value.

Further, with the embodiment, when the serial communication circuit 127 is put in a suspended mode, the above-described Slumber mode is set. The Slumber mode is a suspended mode that is prepared in advance as a power-saving mode of the serial communication circuit 127 which puts, for example the serializer/deserializer 153, the PLL 154 and the PLL 155 in the suspended status. The suspended mode is provided to reduce power consumption by setting the mode either to the Slumber mode or the Partial mode when no exchange of user data or commands with the host is available within a given time period. With the embodiment, it is also possible to put the serial communication circuit 127 to the suspended mode for a specified period of time from the rotation startup of the SPM 114 by using the suspended mode. It should be noted that, like the case of a Serial ATA interface, when a suspended mode such as the Slumber mode or the Partial mode is provided, it is possible to use such suspended mode. However, the suspended mode is not limited to the Slumber mode or the Partial mode. Other methods may be applicable as long as they stop serial communication for a given period of time from the rotation startup of the SPM 114, thus reducing consumption power required for the serial communication circuit 127.

Figure 7:
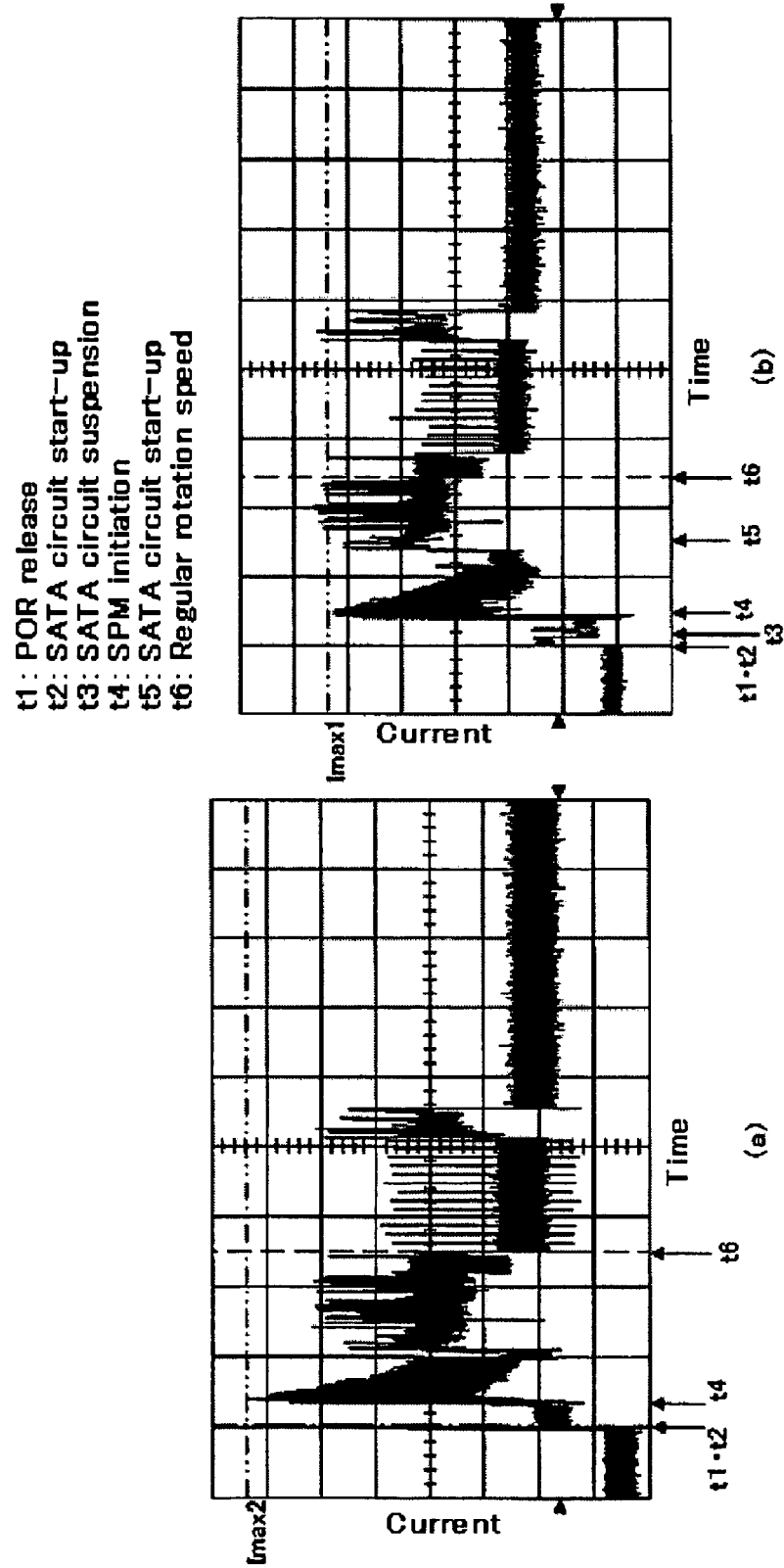
Figure 8:
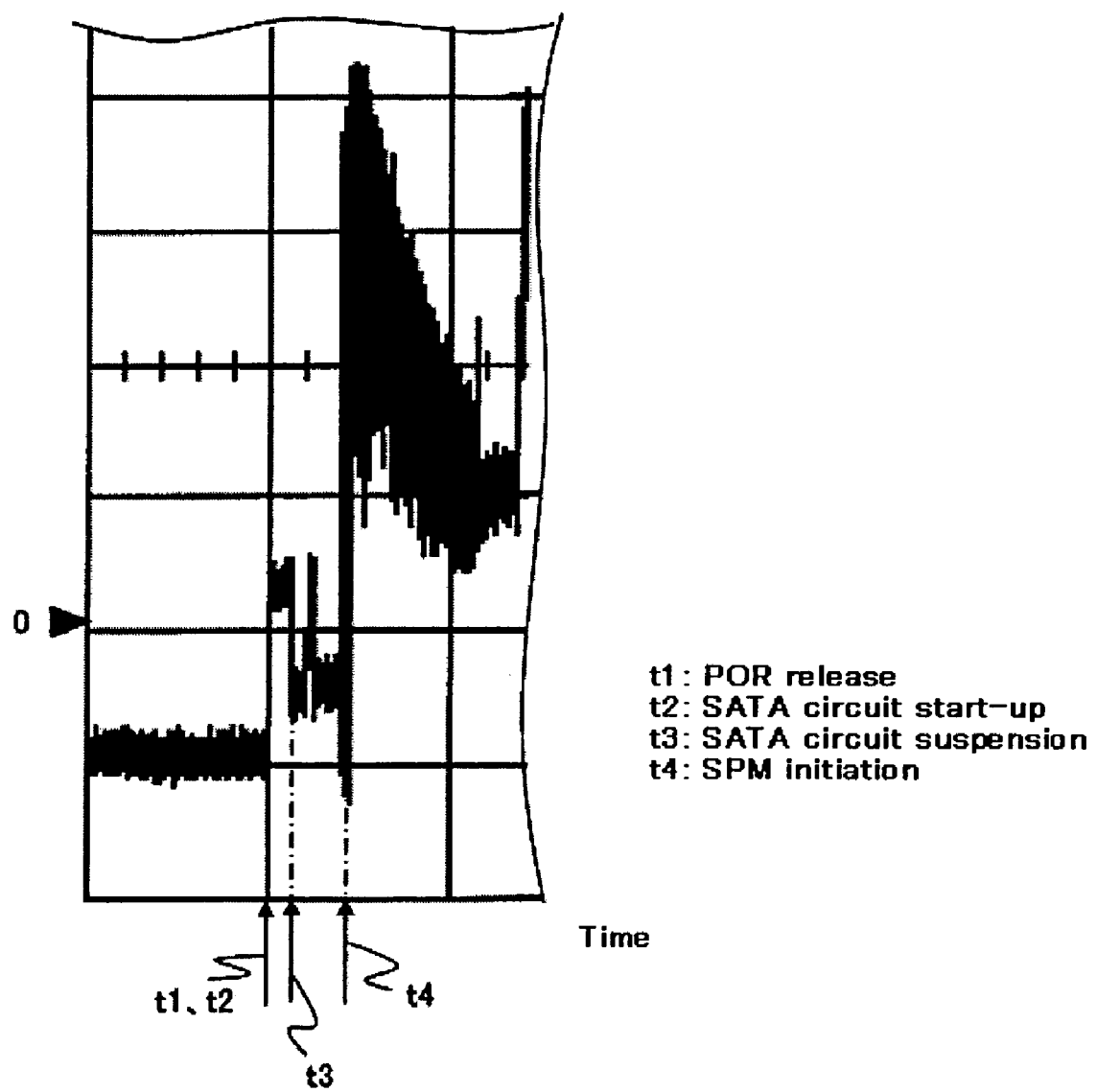
FIG. 8 is a graph showing part of FIG. 7(b) in an enlarged form.
Figure 9:
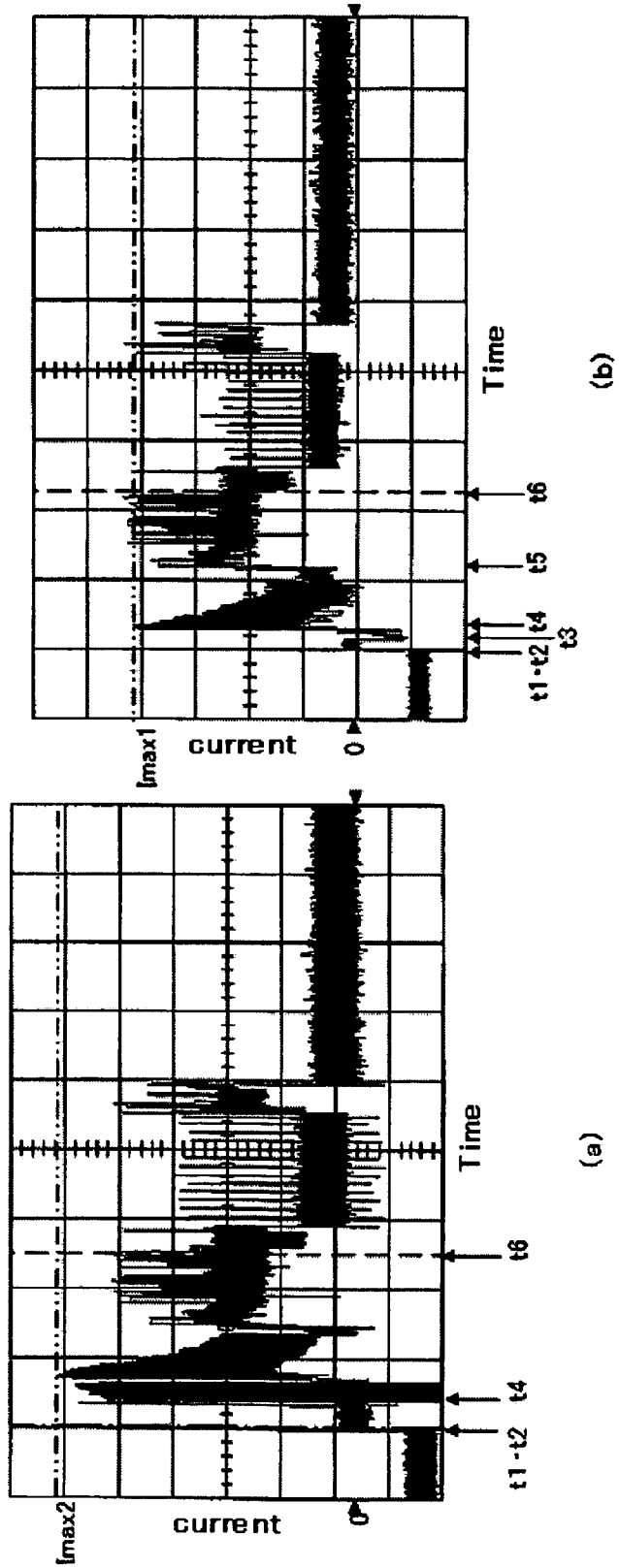
Figure 10:
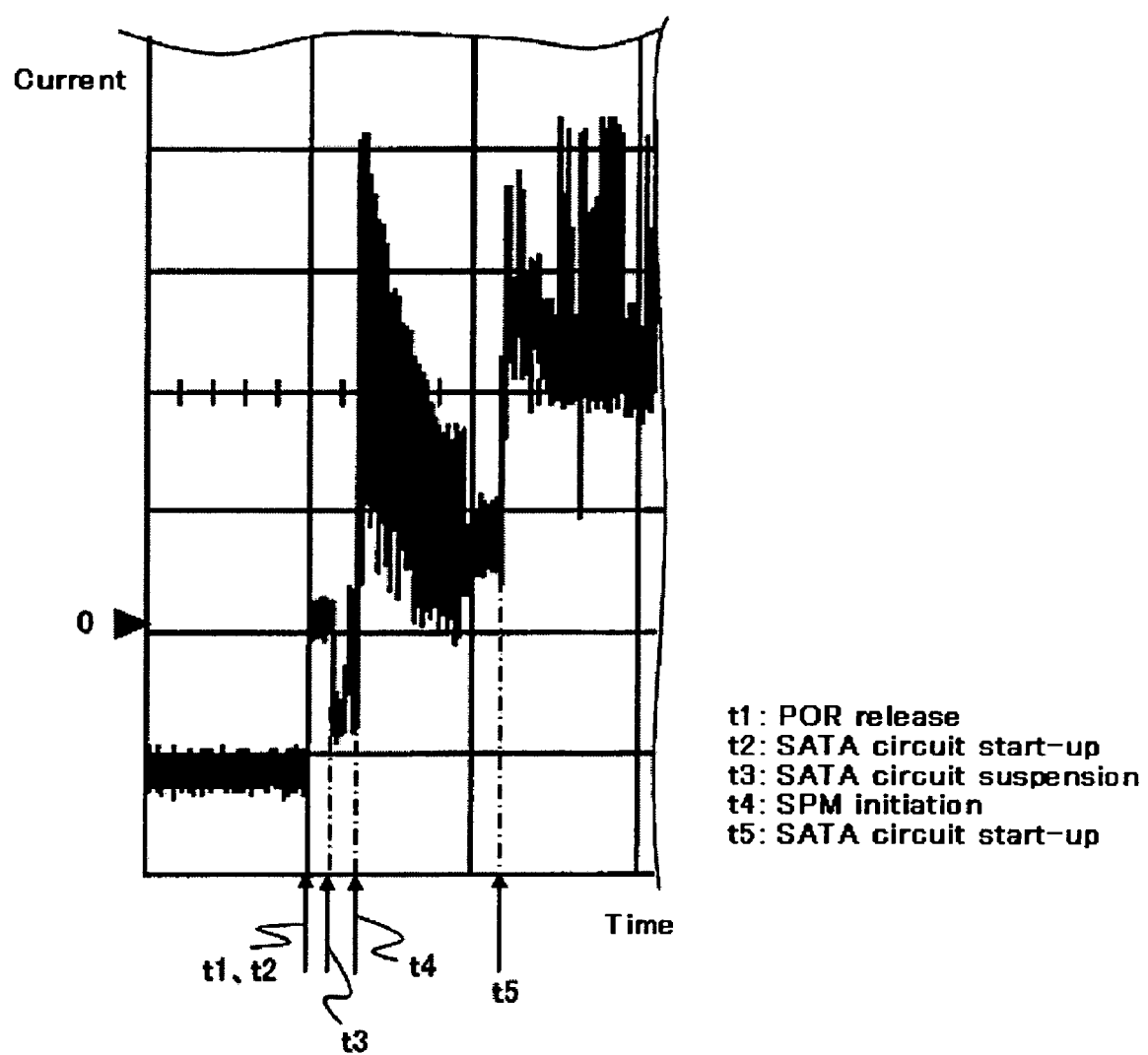
FIG. 10 is a graph showing part of FIG. 9(b) in an enlarged form.

Next, effects of the embodiment will be described in more detail. FIGS. 7(b) and 9(b) are graphs each showing a case where, for two respective different HDDs, rotation of an SPM is started up according to the POR sequence of the embodiment. In addition, FIGS. 8 and 10 are diagrams showing the part of timing t1 to t4 in an enlarged form of FIGS. 7(b) and 9(b), respectively. It should be noted that FIG. 7(a) and FIG. 9(a) respectively show comparative examples each illustrating a case where start-up operations are executed according to the regular POR sequence of a Serial ATA interface. Referring to FIGS. 7 to 10, the vertical axis represents a current value to be consumed in an SPM and a serial communication circuit, and the horizontal axis represents time. The serial communication circuit represents the SATA circuit 150 in the above-described embodiment.

As shown in FIGS. 7(a) and 9(a), as the Serial ATA HDD is started up according to the regular POR sequence, the HDC/MPU will be activated upon cancellation of the POR, which also activates the SATA circuit. It should be noted that, in FIGS. 7(a) and 9(a), the timing for canceling the POR (t1), the timing for starting up the MPU, and the timing for activating the SATA circuit (t2) are almost the same. Thereafter, upon the establishment of startup of each circuit, rotation of the SPM is started up and the electric current reaches the peak value Imax2. The Imax2 includes the current ΔI that is consumed in the serial interface, as stated above.

On the other hand, as shown in FIGS. 7(b), 8, 9(b) and 10, when an HDD is activated according to the POR sequence to which the present invention is applied, the MPU starts up and the SATA circuit is also activated (t2) almost at the same time when startup of the MPU is established (t1). However, the SATA circuit is switched to a suspended mode immediately when startup of the MPU is established. Then, since rotation of the SPM is started up thereafter, the peak current Imax2 at the timing t4 when SPM rotation is started up becomes almost the same value as that of the parallel ATA HDD, and the peak current is smaller than the peak current Imax2 of the comparative example shown in FIGS. 7(b) and 9(a) in which the SPM is started up after the SATA circuit is activated.

As described above in detail, with the embodiment, it is possible to eliminate the consumption current for serial communication that is certainly required in a serial communication HDD by suspending the SATA circuit, thus suppressing the peak current during the SPM rotation startup stage to the level almost equivalent to that of a parallel communication HDD. In addition, it is also possible to reduce time before the SPM reaches the steady rotation speed to almost the same as that of the parallel communication HDD by eliminating a need for a change in current capacity of the host to which the HDD is connected, and by retaining electric current required for starting up rotation of the SPM at the conventional level.

With such capabilities as stated above, it is possible to apply a Serial ATA HDD even to a host that is designed for a parallel communication HDD without compelling a design change. Thus, it is possible to avoid a problem, for example, in that the system does not operate due to the current value exceeding the design value since the peak current value can be retained at a level almost equivalent to that of a parallel ATA HDD.

It should be noted that the present invention is not limited to the above-described embodiment, and it is of course possible to make various modifications without departing from the gist of the present invention. As described above, with the embodiment, the description is made in terms of operations after the POR is cancelled. However, it is obvious that a method similar to the one described above can also be applied when rotation of an SPM is started up. For example, when rotation of an SMP is started up from the suspended status under power-saving modes such as the standby mode and the sleep mode of an HDD, it is possible to minimize electric current required during the SPM rotation startup stage by provisionally suspending part of the serial communication in similar procedures.

Further, with the embodiment, the description is made by taking a Serial ATA HDD as an example, but other types of serial communication HDD can also be applied in the similar way. Furthermore, the relationship between the respective processes and the logical compositions is not limited to the above-described example. For example, each circuit block shown in FIG. 2 can be integrated on a chip or a plurality of chips as required. In addition, in the embodiment, the head element 12 is a read/write head which is capable of executing writing and reading processes, but the present invention is also applicable to a read-only device which is designed to execute reading only. It should be noted that the present invention is particularly useful for a magnetic disk storage device, but it is also applicable to other modes of storage device including an optical disk storage device that drives storage medium.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk device comprising:
a serial communication circuit which executes serial communication with an external device;
a spindle motor which rotates a disk; and
a controller which controls said spindle motor and said serial communication circuit;
wherein said controller initiates communication with said external device by said serial communication circuit when a rotation speed of said spindle motor is a specified reference value or over;
wherein said controller starts up rotation of the said spindle motor after suspending by stopping the operational clocks of at least part of said serial communication circuit, if said serial communication circuit is already activated, when starting up said spindle motor.

2. A disk device according to claim 1,
wherein said controller suspends at least part of said serial communication circuit until the rotation speed of said spindle motor reaches the specified reference value.

3. A disk device according to claim 1,
wherein said controller starts up rotation of the said spindle motor after suspending at least part of said serial communication circuit.

4. A disk device according to claim 1,
wherein one or more suspended modes are provided which suspend at least part of said serial communication circuit; and
wherein said controller sets said serial communication circuit to any one of said one or more suspended modes before starting up rotation of said spindle motor.

5. A disk device according to claim 1,
wherein said serial communication circuit includes a conversion circuit which converts a serial signal received from said external device to a parallel signal and converts a signal to be transmitted to said external device back to a serial signal; and
wherein said controller suspends said conversion circuit during a period of time from the point when said spindle motor starts up rotation until the point when said spindle motor reaches a specified rotation speed.

6. A method of control the disk device according to claim 1, the method comprising:
preparing an active mode at which said serial communication circuit communicates with said external device, and a plurality of suspended modes which suspend at least part of said serial communication circuit; and
allowing said controller to set said serial communication circuit to a suspended mode, among said plurality of suspended mode, whose switching time to the active mode is about 10 msec. or below, until the rotation speed of said spindle motor reaches the specified reference value.

7. A disk device according to claim 1,
wherein said serial communication circuit conforms to the Serial ATA Standard.

8. A disk device according to claim 1,
wherein said disk device is a hard disk drive conforming to the Serial ATA Standard.

9. A method of controlling a disk device having a serial communication circuit which executes serial communication with an external device and a spindle motor which rotates a disk, said method comprising:
monitoring a rotation speed of said spindle motor; and
initiating serial communication with said external device by said serial communication circuit when said rotation speed exceeds a specified reference value;
wherein, when the serial communication with said external device by said serial communication circuit is already executed at the time of starting up rotation of said spindle motor, said serial communication circuit is set to any one of said one or more suspended modes which suspend at least part of said serial communication circuit.

10. A method of controlling a disk device according to claim 9,
wherein at least part of said serial communication circuit is suspended for a specified period of time until said rotation speed reaches the specified reference value.

11. A method of controlling a disk device according to claim 10,
wherein said specified period of time during which at least part of said serial communication circuit is suspended is a time period that is required for the driving current to be applied to said spindle motor to decrease a current value required to initiate said serial communication circuit from the maximum value during the rotation startup stage.

12. A method of controlling a disk device according to claim 9,
wherein said specified reference value is a rotation speed at which the driving current to be applied to said spindle motor is equivalent to or less than a specified value.

13. A method of controlling a disk device according to claim 9,
wherein, said serial communication circuit is switched to a suspended mode whose switching time to said active mode is about 10 μsec. or below among said one or more suspended modes from the active mode under which said serial communication circuit executes serial communication with said external device, and thus starting up rotation of said spindle motor.

14. A method of controlling a disk device according to claim 9, further comprising:
suspending said serial communication circuit which is automatically initiated after cancellation of a Power On Reset function;
starting up rotation of said spindle motor after the suspension of said serial communication circuit; and
initiating said serial communication circuit after said rotation speed of said spindle motor reaches the specified reference value.

15. A method of controlling a disk device according to claim 9, comprising:
initializing said controller after cancellation of a Power On Reset function;
executing a memory check;
starting up rotation of said spindle motor after suspending said serial communication circuit which is automatically initiated after cancellation of said Power On Reset function; and
monitoring said rotation speed of said spindle motor and initiating said serial communication circuit after said rotation speed reaches the specified standard value.

* * * * *